United States Patent [19]
Matsumura

[11] 3,782,786
[45] Jan. 1, 1974

[54] MODULATOR IN ANTI-SKID SYSTEM
[75] Inventor: Yoshihiro Matsumura, Yokosuka, Japan
[73] Assignee: Nippon Air Brake Company Ltd., Kobe, Japan
[22] Filed: July 18, 1972
[21] Appl. No.: 272,964

[52] U.S. Cl............................. 303/21 F, 188/181 A
[51] Int. Cl................................................. B60t 8/06
[58] Field of Search...................... 303/21 F, 61–63, 303/68–69, 10, 6 C, 6 R, 54; 188/181; 137/513.3, 512.2; 251/30, 61.5, 61.2

[56] References Cited
UNITED STATES PATENTS
3,719,400  3/1973  Schenk............................. 303/21 F Primary Examiner—Duane A. Reger
Assistant Examiner—D. C. Butler
Attorney—Vern L. Oldham et al.

[57] ABSTRACT

A modulator in an anti-skid system for vehicles in which two valves are disposed in the path of fluid under pressure from a master cylinder to wheel cylinders. In the initial stage of fluid pressure application to the wheel cylinders, the first and second valves are opened and closed respectively, while in the stage of pressure control following the initial stage, the first and second valves are closed and opened respectively, and the second valve member is cyclically closed and opened so that the fluid under pressure can be supplied at controlled rate through an orifice and the second valve.

2 Claims, 2 Drawing Figures

MODULATOR IN ANTI-SKID SYSTEM

This invention relates to a brake fluid pressure control device (hereinafter to be referred to as a modulator) used in an anti-skid system for automotive vehicles, and more particulary to improvements in the structure of valve means used in such a modulator.

An anti-skid system is widely employed in automotive vehicles for imparting a braking force to the road-engaging wheels in the vicinity of the maximum coefficient of friction $\mu_{max}$ between the road surface and the road-engaging wheels during application of the brake so as to stop the vehicle within a shortest possible distance with a most effective braking force without impartation of any excessive braking force. To this end, a modulator is disposed at a suitable position on a brake fluid conduit leading from a master cylinder to wheel cylinders so as to automatically control the brake fluid pressure. This modulator controls the brake fluid pressure at a rate of several cycles per second so that the braking force can be imparted to the wheels in the vicinity of $\mu_{max}$ above described.

However, due to the fact that modulators in conventional anti-skid systems are provided with only one piston valve member for carrying out the brake fluid pressure control, irregular pulsation occurs inevitably in the fluid pressure under control when the pressure of fluid supplied from the master cylinder is high and the gain is high. In an extreme case, an undesirable situation occurs frequently such that the amplitude of pulsation attains an excessively high level which is substantially equal to the level of the full pressure of fluid supplied from the master cylinder. Thus, the conventional anti-skid system of the kind above described has not been satisfactory in ensuring the desired anti-skid effect, resulting in impossibility of stopping the vehicle within a predetermined minimum distance. Needless to say, such a system is in no way a completely satisfactory system.

With a view to obviating the drawback encountered with the conventional anti-skid system, it is a primary object of the present invention to provide a novel and improved modulator including two valve members disposed in the path of fluid from a master cylinder to wheel cylinders and an orifice portion formed in the passage of fluid leading to one of the valve members.

The modulator according to the present invention is advantageous in that the irregular pulsation, especially the excessively large pulsation component of the kind above described which is substantially equal to the level of the full pressure of the master cylinder can be absorbed by the above mentioned orifice portion and the braking force can be controlled substantially completely so that it can be imparted to the wheels in the vicinity of $\mu_{max}$.

Figure 1:
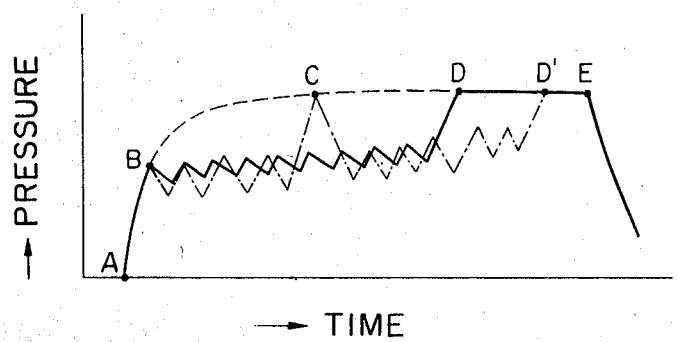
FIG. 1 is a graph showing the pressure control characteristic of a modulator according to the present invention for comparison with a similar characteristic of a conventional modulator.

Referring first to FIG. 1, brake fluid pressure is controlled relative to time in a manner as shown upon actuation of the brake. At a point A in FIG. 1, the application of the brake fluid pressure is started by the action of the master cylinder in response to the depression of the brake pedal. The fluid pressure in the master cylinder increases from the point A to its maximum level along the solid curve AB, dotted curve BCD and solid curve DD'E as shown. At the point E, the force imparted to the brake pedal is released and the brake fluid pressure decreases abruptly.

The one-dot chain curve represents the manner of brake fluid pressure control by a conventional modulator. According to the conventional modulator, the piston valve member in the modulator is actuated to reduce the brake fluid pressure when the point B is reached at which the brake fluid pressure is slightly higher than the brake fluid pressure corresponding to the maximum coefficient of friction $\mu_{max}$. When the brake fluid pressure is reduced to a level slightly lower than the brake fluid pressure corresponding to the maximum coefficient of friction $\mu_{max}$, the piston valve member is actuated again to increase the brake fluid pressure again. The decrease and increase or pulsation of the brake fluid pressure in the manner above described is repeated at a rate of several cycles per second. However, in the case in which the pressure of fluid supplied from the master cylinder is high and the gain is high, the pulsation in the manner above described tends to become irregular and an excessively large pulsating pressure component (as shown at point C) substantially equal to the full fluid pressure of the master cylinder appears frequently during the brake fluid pressure control, resulting in undesirable skidding of the wheels in the period in which such excessive brake fluid pressure as high as the level of the point C appears. This is objectionable in that the effective distance or period of time D' for bringing the vehicle to a halt is inevitably extended. Further, an excessive rise in the brake fluid pressure which may appear when the anti-skid system is rendered inoperative would impair or damage the elements in the brake system.

According to the present invention, the pressure control starting from the point B follows the solid curve in zigzag form and the pulsation of the brake fluid pressure occurs regularly at a rate of constant cycles within a limited range in the vicinity of the pressure corresponding to the maximum coefficient of friction $\mu_{max}$ so that the vehicle can be stopped at time D earlier than prior art time D' without in any way producing an undesirable excessively large pulsating pressure component.

Figure 2:
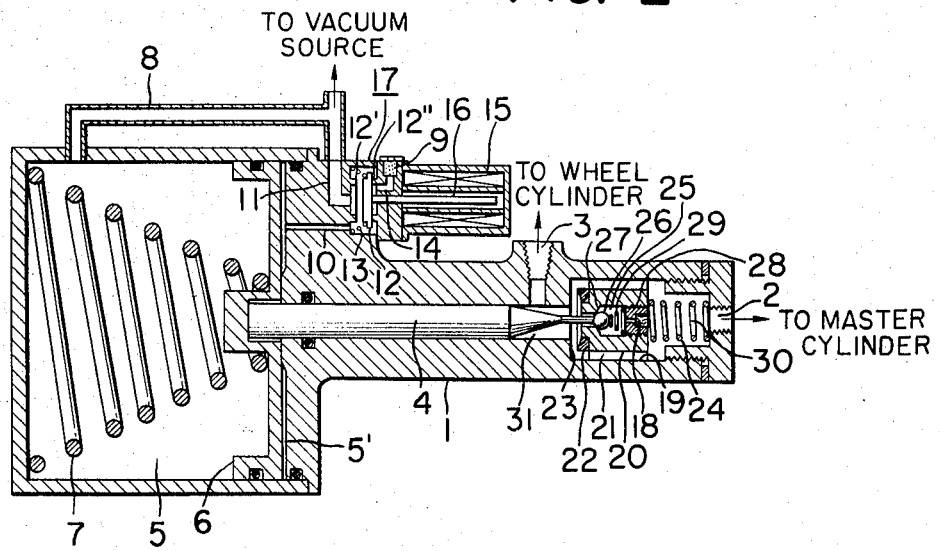
FIG. 2 is a schematic axial section of a preferred embodiment of the present invention.

Such an improved characteristic can be obtained by a modulator having a structure as shown in FIG. 2. Referring to FIG. 2, elements common to those employed in a conventional modulator will be first described. The modulator according to the present invention comprises a body 1 which is provided with a pair of ports 2 and 3 communicating with a master cylinder and wheel cylinders (not shown) respectively. A valve device of novel construction according to the present invention as will be described later is disposed between these ports 2 and 3. A plunger 4 is slidably disposed in the body 1 and abuts at its rear or left-hand end with a piston 6 movable within a space which is divided into two vacuum chambers 5 and 5' by the piston 6. A spring 7 is disposed in the vacuum chamber 5 to normally urge the piston 6, hence the plunger 4 bearing against the piston 6 forward or rightward in FIG. 2. The vacuum chamber 5 communicates with a source of vacuum (not shown) by way of a passage 8. The vacuum chamber 5' communicates with an electromagnetic change-over valve means 17 by way of a passage 10.

The electromagnetic change-over valve means 17 includes a valve member 12, an armature 16, and an electromagnet 15 energized by a controller (which is not shown but generates a signal to energize the electromagnet 15 to ultimately relieve the brake, for example when the rotation deceleration of wheels is larger than a predetermined value) so as to selectively provide communication between the passage 10 and a passage 11 communicating with the source of vacuum and between the passage 10 and another passage 14 communicating with the atmosphere through a filter 9. Normally or when the brake is not actuated, the valve member 12 is urged away from a valve seat 12' by the force of a spring 13 and is seated on a valve seat 12" opposite to the valve seat 12' so that the chamber 5' communicates with the vacuum source by way of the passages 10 and 11. In this state, the pressures in the vacuum chambers 5 and 5' are equal to each other and the piston 6 is urged forward or rightward in FIG. 2 by the force of the spring 7. When the electromagnet 15 is energized to urge the armature 16 rearward or leftward in FIG. 2, the valve member 12 engaged by the rear or left-hand end of the armature 16 is urged rearward or leftward against the force of the spring 13 to move away from the valve seat 12" and is now seated on the valve seat 12' thereby interrupting the communication between the passages 10 and 11 and allowing the passage 10 to communicate with the passage 14 communicating with the atmosphere through the filter 9. Therefore, the atmospheric pressure is applied to the vacuum chamber 5' and urges the piston 6 rearward or leftward in FIG. 2 against the force of the spring 7. Accordingly the plunger 4 also is urged rearwards by the fluid under pressure in the fluid chamber 31. As a result, the valve means disposed between the ports 2 and 3 is urged to the closed position to shut off the supply of fluid under pressure from the master cylinder to the wheel cylinders. Afterwards, the volume of the fluid chamber 31 increases and the fluid pressure in the chamber 31, or the fluid pressure in the wheel cylinder is relieved. The structure and operation of the elements above described are similar to those of the conventional modulator.

According to the present invention, a cylinder portion 19 is formed in the body 1 between the ports 2 and 3 and a hollow piston 20 is slidably received in this cylinder portion 19. The piston 20 is provided with a plurality of channel portions 21 on its outer periphery. A valve member 22 of rubber or like material is fitted on the rear or left-hand end of the piston 20 opposite to a valve seat 23, and a spring 24 engages the front or right-hand end of the piston 20 so as to normally bias the valve member 22 toward the valve seat 23. Further, the piston 20 is provided with a central hollow space or chamber 25 which communicates at its rear or left-hand side with a fluid chamber 31 through a small-diameter axial port bored in the piston 20. The front or right-hand end portion of the plunger 4 extends through the small-diameter port into the chamber 25 and a ball valve member 26 is mounted on the front or right-hand end of the plunger 4 so as to be engageable with a valve seat 27 formed at a shoulder portion of the chamber 25. The chamber 25 communicates at its front or right-hand side with a fluid chamber 30 through an orifice portion 28 formed in the piston 20, and a spring 29 is disposed between the ball valve member 26 and the right-hand wall of the chamber 25 in the piston 20.

A filter 18 is fitted in the orifice portion 28 to prevent undesirable sticking of the ball valve member 26 to the valve seat 23 due to foreign matters.

The operation of the valve device having such a structure will now be described. In the present invention, the force of the spring 29 biasing the ball valve member 26 rearward or in the left-hand direction is selected to be greater than the force of the spring 24 biasing the piston 20 rearward or in the left-hand direction. Besides, as the force of the spring 7 is very great, the piston 6 is not moved by the forces of the springs 29, 24, and the pressures of the fluid chambers 31, 30 acting through the plunger 4 except by the differential pressure in the chambers 5 and 5' on both sides of the piston 6. Thus, in the state in which no control is applied to the brake fluid pressure, that is, in the state shown in FIG. 2, as the said differential pressure of the chambers 5 and 5' is zero, the piston 6 is urged forwards by the spring 7, the righthand end of the plunger 4 urges the ball valve member 26 forwardly or to the right. But, as the force of the spring 29 is larger than that of the spring 24, the valve member 26 is in its closed position and the valve member 22 is in its open position. Therefore, the fluid under pressure is supplied from the master cylinder to the wheel cylinders through the peripheral channels 21 of the piston 20 and through the gap between the valve member 22 and the valve seat 23 in the initial range between the points A and B in FIG. 1.

After the point B in FIG. 1, the fluid pressure in the wheel cylinders is controlled by the valve device according to the present invention. That is, as was described before, the piston 6 is urged rearwards by the differential pressure in the chambers 5 and 5' on both sides, the plunger 4 also is urged rearwards by the fluid under pressure in the fluid chamber 31 and the valve member 22 is seated on the valve seat 23 by the spring 24 to be in its closed position. Suppose that $P_1$, $P_2$, $S_1$, $S_2$, $f_1$ and $f_2$ are the fluid pressure in the fluid chamber 31, the fluid pressure in the fluid chamber 30, the effective area of the valve 22, the effective area of the valve 26, the force of the spring 24, and the force of the spring 29 respectively. There is the relation $f_1 < f_2$ between $f_1$ and $f_2$ as above described and $S_2$ is selected to be sufficiently smaller than $S_1$. Therefore, the valve member 22 is biased toward the valve seat 23 by the force $(P_2 - P_1) \times S_1 + f_1$, and the valve member 26 is biased toward the valve seat 27 by the force $(P_2 - P_1) \times S_2 + f_2$. Since $S_2$ is selected to be sufficiently smaller than $S_1$, the force biasing the valve member 26 toward the valve seat 27 is smaller than the force biasing the valve member 22 toward the valve seat 23. Thus, in the case in which the difference between the fluid pressures in the fluid chambers 30 and 31 is larger than a predetermined setting of, for example, 5 kilograms per square centimeter, and the right hand end of the plunger and the plunger 4 move to the right by the action of the controller on the valve 12, the valve member 22 is held in its closed position but the valve member 26 is urged to its open position. Accordingly the fluid under pressure in the fluid chamber 30 is supplied at a relatively gradual and controlled rate to the fluid chamber 31 through the orifice portion 28 and the small-diameter port in the piston 20. The valve member 26 has sharp sensitivity, since $S_2$ is small and said valve member 26 is opened by the plunger 4 through the piston 6 with the great force of the spring 7 and the differential pressure in the chambers 5 and 5'. Due to the above fact, an undesirable irregularly pulsating pressure component, especially an excessively large pulsating pressure component of the wheel cylinders substantially equal to the full fluid pressure of the master cylinder, which has been frequently encountered with the prior art modulator, is absorbed by the orifice of the orifice portion 28 and does not appear even when the fluid pressure at the side of the master cylinder is considerably high. According to the present invention, the fluid pressure applied to the wheel cylinders varies gently and regularly within the limited range in the vicinity of the fluid pressure corresponding to $\mu_{max}$ and it is represented by the solid zigzag line extending to the right from B in FIG. 1. The controller actuates the electromagnet valve 17 at B for the time interval indicated by the first downwardly extending portion of the zigzag line and for each succeeding downwardly inclined line, but the electromagnet valve is released for each upwardly directed section of the zigzag line when the plunger 4 moves forward or rightward. It will be understood that the desired anti-skid operation can be reliably carried out to stop the vehicle at the time D earlier than the prior time D' along the solid curve shown in FIG. 1. Further, the elements in the brake system would not be impaired and their long service life can be emsired due to the fact that an abrupt pressure rise can be prevented even when the anti-skid system ceases its operation in a low speed range of, for example, less than 8 kilometers per hour.

What is claimed is:

1. A modulator for use in an anti-skid system for automotive vehicles wherein the volume of the fluid under pressure during braking varies by the slide movement of a plunger disposed so that the brake action is controlled thereby, comprising a first valve member disposed in a fluid passage of larger diameter in the path of fluid under pressure from a master cylinder to a wheel cylinder, a second valve member communicating with said master cylinder through a fluid flow restricting passage of small diameter in said path of fluid under pressure, a first spring normally biasing said first valve member toward an associated valve seat, and a second spring normally biasing said second valve member toward an associated valve seat, wherein said first and second valve members are in the open and closed positions respectively in the initial stage of fluid pressure application to said wheel cylinder without any control, while in the stage of fluid pressure control following said initial stage, said first and second valve members are urged to the closed and open positions respectively in response to a predetermined pressure difference between the fluid pressure at the side of said master cylinder and the fluid pressure at the side of said wheel cylinder, said second valve member being afterwards urged to the closed and open positions by the sliding movement of said plunger in combination with said second spring so that the fluid under pressure can be supplied at a controlled rate through said fluid flow restricting passage when necessary.

2. A modulator as claimed in Claim 1, wherein the force of said second spring biasing said second valve member is selected to be greater than the force of said first spring biasing said first valve member, and said second valve member is solely urged to the closed and open positions when necessary with said valve member being maintained in the closed position when said predetermined pressure difference appears.

* * * * *